United States Patent [19]
Hall et al.

[11] Patent Number: 5,398,216
[45] Date of Patent: Mar. 14, 1995

[54] METHOD FOR DETECTING TWO-DIMENSIONAL FLOW FOR ULTRASOUND COLOR FLOW IMAGING

[75] Inventors: Anne L. Hall, New Berlin, Wis.; Richard B. Bernardi, Strafford, Pa.

[73] Assignee: General Electric Company, Milwaukee, Wis.

[21] Appl. No.: 113,003

[22] Filed: Aug. 30, 1993

[51] Int. Cl.[6] .......................... G01F 1/66; A61B 8/06
[52] U.S. Cl. ............................... 367/90; 128/661.08; 73/861.25
[58] Field of Search ........................... 367/89, 90, 103; 128/661.08, 661.09, 661.10; 73/861.25

[56] References Cited
PUBLICATIONS

Tamura et al., "Quantitative Study of Steady Flow Using Color Doppler Ultrasound", Ultrasound in Med. & Biol., vol. 17, No. 6 (1991).
Overbeck et al., "Vector Doppler: Accurate Measurement of Blood Velocity in 2-D", Ultrasound in Med. & Biol., vol. 18, No. 1 (1992), pp. 19–31.
Vera et al., "Visualization of Complex Flow Fields etc.", vol. 18, No. 1 (1992), pp. 1–9.

*Primary Examiner*—Ian J. Lobo
*Attorney, Agent, or Firm*—Dennis M. Flaherty; John H. Pilarski

[57] ABSTRACT

A triangulation method and apparatus for measuring the velocity of a flowing material at a point of interest along two lines of sight which have different vector components. The flow velocity along two different image vectors is measured simultaneously by separately processing the signals from left and right reception apertures (14, 16). In one case, the positions of the reception apertures are held constant and conventional dynamic focussing on receive is used to steer the apertures to follow the transmitted energy as a function of range depth. In an alternative case, the transducers included in each reception aperture are dynamically reassigned in order to maintain a fixed triangulation angle. In this case a reception aperture shifts away from the transmission aperture (12) to track the received backscattered ultrasonic energy at a constant triangulation angle.

23 Claims, 7 Drawing Sheets

METHOD FOR DETECTING TWO-DIMENSIONAL FLOW FOR ULTRASOUND COLOR FLOW IMAGING

FIELD OF THE INVENTION

This invention generally relates to ultrasound color flow Doppler imaging of fluid flow fields. In particular, the invention relates to a method and an apparatus for imaging blood flowing in the human body by detecting Doppler shifting of ultrasonic echoes reflected from the flowing blood.

BACKGROUND OF THE INVENTION

Conventional ultrasound imaging systems comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred beam direction and is focussed at a selected point along the beam. By changing the time delay and amplitude of the applied voltages, the beam with its focal point can be moved in a plane to scan the object.

The same principles apply when the transducer is employed to receive the reflected sound (receiver mode). The voltages produced at the receiving transducers are summed so that the net signal is indicative of the ultrasound reflected from a single focal point in the object. As with the transmission mode, this focussed reception of the ultrasonic energy is achieved by imparting separate time delay (and/or phase shifts) and gains to the signal from each receiving transducer.

This form of ultrasonic imaging is referred to as "phased array sector scanning". Such scanning comprises a series of measurements in which the steered ultrasonic wave is transmitted, the system switches to receive mode after a short time interval, and the reflected ultrasonic wave is received and stored. Typically, transmission and reception are steered in the same direction ($\theta$) during each measurement to acquire data from a series of points along an acoustic beam or scan line. The receiver is dynamically focussed at a succession of ranges (R) along the scan line as the reflected ultrasonic waves are received.

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color.

Figure 1:
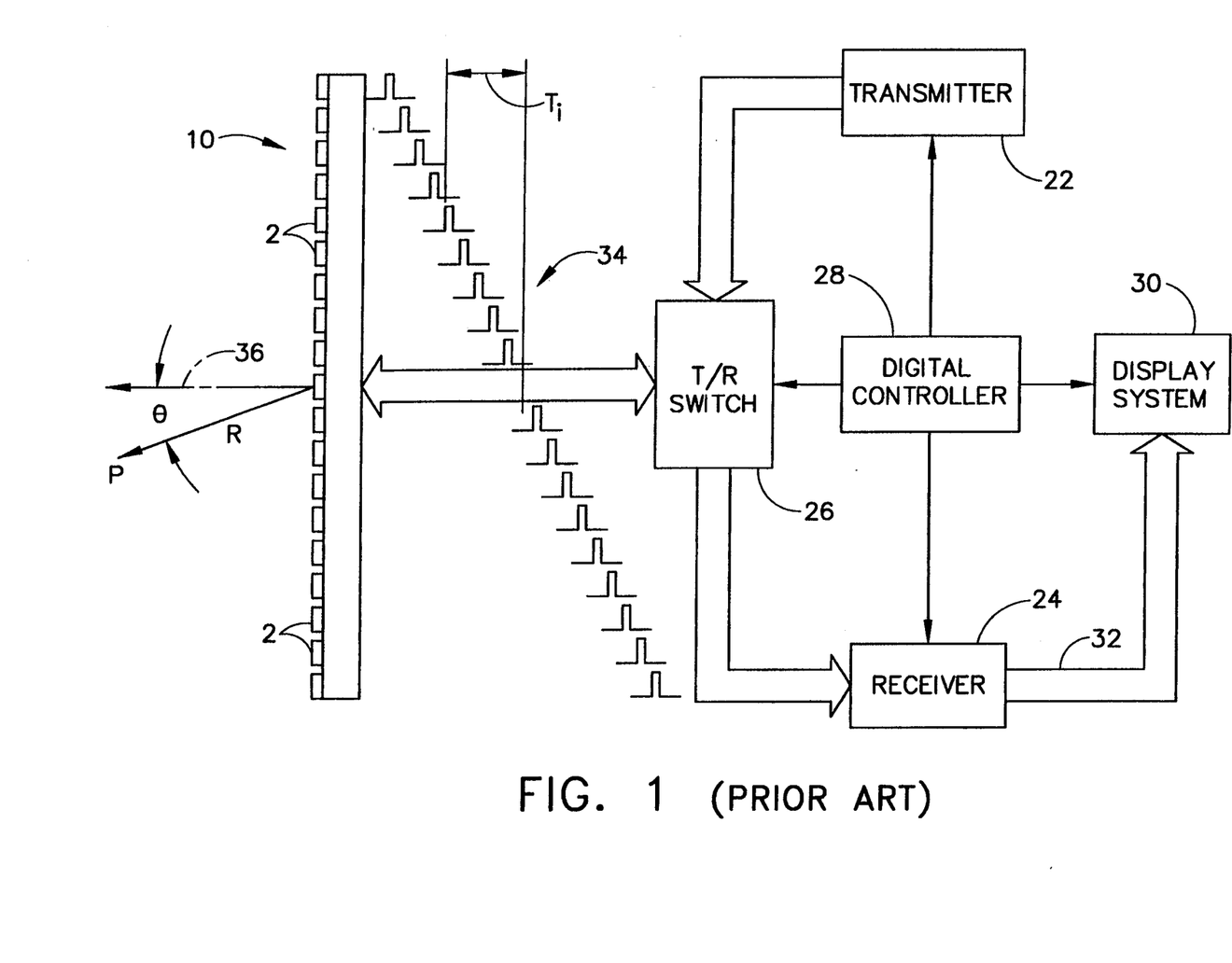
FIG. 1 is a block diagram of a conventional ultrasonic imaging system.

Referring to FIG. 1, a vibratory energy imaging system includes a transducer array 10 comprised of a plurality of separately driven transducers 2, each of which produces a burst of ultrasonic energy when energized by a pulsed waveform produced by a transmitter 22. The ultrasonic energy reflected back to transducer array 10 from the object under study is converted to an electrical signal by each receiving transducer 2 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit position, transmitter 22 is gated ON momentarily to energize each transducer 2, switches 26 are then set to their receive position, and the subsequent echo signals produced by each transducer 2 are applied to receiver 24. The separate echo signals from each transducer 2 are combined in receiver 24 to produce a single echo signal which is used to produce a line in an image on a display system 30.

Transmitter 22 drives transducer array 10 such that the vibrational energy produced, e.g., ultrasonic energy, is directed, or steered, in a beam. A scan can therefore be performed by moving this beam through a set of angles from point-to-point rather than physically moving transducer array 10. To accomplish this, transmitter 22 imparts a time delay ($T_i$) to the respective pulsed waveforms 34 that are applied to successive transducers 2. If the time delay for all transducers is the same, all the transducers 2 are energized simultaneously and the resulting ultrasonic beam is directed along an axis 36 normal to transducer array 10 focussed to a point at infinity. By adjusting the time delays ($T_i$) appropriately, the ultrasonic beam can be directed away from axis 36 by an angle ($\theta$) and/or focussed at a certain depth. The relationship between the time delay $T_i$ applied to each i-th signal from one end of the transducer array (i=1) to the other end (i=n) is given by the relationship:

$$T_i = \frac{R_T}{c} - \sqrt{\left(\frac{R_T}{c}\right)^2 + \left(\frac{x}{c}\right)^2 - \frac{2 \times R_T \sin\theta}{c^2}} \quad (1)$$

where x is the distance of the center of transducer 2 from the center of the transducer array, $\theta$ is the transmit beam angle, c is the velocity of sound in the object under study, and $R_T$ is the range at which the transmit beam is focussed.

The time delays $T_i$ in Eq. (1) have the effect of steering the beam at the desired angle $\theta$ and focussing it at a fixed range $R_T$. A sector scan is performed by progressively changing the time delays $T_i$ in successive excitations. The angle $\theta$ is thus changed in increments to steer the transmitted beam in a succession of directions. When the direction of the beam is on the other side of axis 36, the timing of pulses 34 is reversed, but Eq. (1) still applies.

The echo signals produced by each burst of ultrasonic energy reflect from objects located at successive positions (R) along the ultrasonic beam. These are sensed separately by each transducer 2 and a sample of the magnitude of the echo signal at a particular point in time represents the amount of reflection occurring at a specific range (R). Due to the differences in the propagation paths between a reflecting point P and each transducer 2, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle $\theta$. Demodulation can occur either before or after the individual received signals are summed together.

Figure 2:
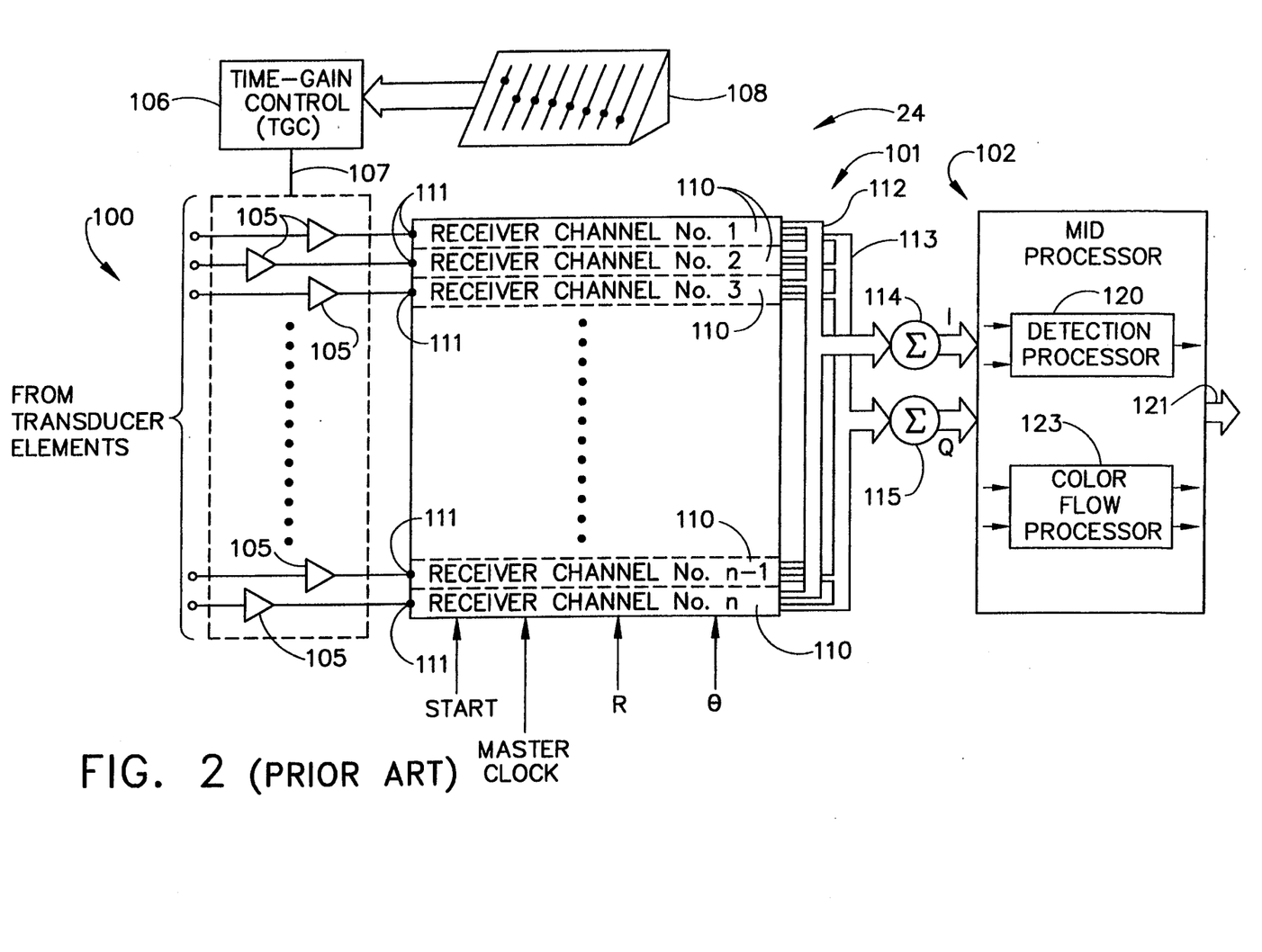
FIG. 2 is a block diagram of a receiver which forms part of the system of FIG. 1.

To simultaneously sum the electrical signals produced by the echoes impinging on each transducer 2, time delays are introduced into each separate transducer channel 110 of receiver 24 (see FIG. 2). The beam time delays for reception are the same delays ($T_i$) as the transmission delays described above. However, the time delay of each receiver channel is continuously changing during reception of the echo to provide dynamic focussing of the received beam at the range R from which the echo signal emanates. The exact equation for the receive time delay $T_d$ imposed on the signal received by each transducer element is as follows:

$$T_d = \frac{t}{2} - \sqrt{\left(\frac{t}{2}\right)^2 + \left(\frac{x}{c}\right)^2 - \left(\frac{xt}{c}\right)\sin\theta} \quad (2)$$

where t is the elapsed time after transmission of ultrasound from the center of the transducer array, c is the velocity of sound in the object under study, $\theta$ is the beam angle, and x is the distance of the center of the receiving transducer from the center of the transducer array.

Under direction of digital controller 28, receiver 24 provides delays during the scan such that steering of receiver 24 tracks the direction $\theta$ of the beam steered by transmitter 22 and samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 30 receives the series of data points produced by receiver 24 and converts the data into the desired image.

Referring to FIG. 2, receiver 24 comprises three sections: a time-gain control section 100, a receive beam forming section 101 and a mid-processor 102. Time-gain control (TGC) section 100 includes a respective amplifier 105 for each of the receiver channels 110 and a time-gain control circuit 106. The input of each amplifier 105 is connected to a respective one of transducers 2 to amplify the echo signal which it receives. The amount of amplification provided by amplifiers 105 is controlled through a control line 107 that is driven by TGC circuit 106, the latter being set by hand operation of potentiometers 108. As the range of the echo signal increases, its amplitude diminishes. The time interval over which the echo signal is acquired determines the range from which it emanates, and this time interval is divided into segments by TGC circuit 106. The settings of the potentiometers for each segment are employed to set the gains of amplifiers 105 during each time interval so that the echo signal is amplified in ever-increasing amounts over the echo signal acquisition time interval.

The receive beam forming section 101 of receiver 24 includes separate receiver channels 110. Each receiver channel 110 receives the analog echo signal from one of amplifiers 105 at an input 111 and produces a stream of digitized output values on an I bus 112 and a Q bus 113. Each of these I and Q values represents a demodulated sample of the echo signal envelope at a specific range (R). These samples have been delayed such that when they are summed at summing points 114 and 115 with the I and Q samples from each of the other receiver channels 110, the summed signals indicate the magnitude and phase of the echo signal reflected from a point P located at range R on the steered beam ($\theta$). Alternatively, the demodulation can be performed after the individual received signals are summed.

Mid-processor section 102 receives the beam samples from summing points 114 and 115. The I and Q values of each beam sample are signals representing the in-phase and quadrature components of the magnitude of the reflected sound from a point (R, $\theta$). Mid-processor 102 can perform a variety of calculations on these beam samples, depending on the type of image to be reconstructed.

A color flow processor 123 located in mid-processor 102 receives the I and Q values of each demodulated and focussed echo signal sample from summing points 114 and 115, and produces a flow value at the mid-processor output 121. This flow signal controls the red, green and blue display colors, and is applied to display system 30 along with the magnitude M for the same point. The color indicated by this flow value is a function of the velocity and direction of flow, and possibly the flow variance or power, as measured by color flow processor 123.

Thus, conventional ultrasound color flow imaging systems are able to image moving materials, such as blood flowing in the body, by relying on the fact that echoes returning from these moving objects are Doppler shifted. One major limitation of conventional flow imaging techniques, however, is that the measured Doppler shift is proportional to only the velocity component along the direction of the ultrasound beam and not the true velocity. Therefore, the displayed velocity is underestimated by the cosine of the angle between the ultrasonic beam and the fluid flow, and could be missed entirely if the angle is too large.

Several methods have been explored to address this problem. Among these methods are triangulation techniques, wherein the velocity of a region of interest is measured from two different directions, and the two velocity estimates are geometrically combined to yield the total velocity magnitude and direction. This has been accomplished in a number of different ways. A paper by Tamura et al. entitled "Quantitative Study of Steady Flow Using Color Doppler Ultrasound", Ultrasound in Medicine and Biology, Vol. 17, No. 6 (1991), discloses the use color flow frames acquired by steering a linear array of transducers at two different angles. A disadvantage of this system is that two measurements are made at different times, and one must assume that the flow dynamics is unchanged during the interval of time between the measurements. In pulsatile flow studies, the flow stationarity time is generally considered to be on the order of 10 msec, so that separately steered frames acquired in times greater than this cannot be used.

In order to accomplish simultaneous measurement of multiple velocity components, other methods involving special-purpose transducer setups have been proposed. A paper by Overbeck et al. entitled "Vector Doppler: Accurate Measurement of Blood Velocity in Two Dimensions", Ultrasound in Medicine and Biology, Vol 18, No. 1 (1992), reports on the use of a combination of one transmitting transducer flanked by two receiving transducers. The disadvantage of this system is that only the region of interest at the intersection point of the lines of sight for the three transducers is interrogated. Therefore, although this method has promise for a Doppler application, it cannot create a complete image for the color flow imaging application.

SUMMARY OF THE INVENTION

The present invention enables the acquisition of an ultrasound color flow image by simultaneously measuring two Doppler-shifted vector components at a multiplicity of points across an entire region. The basic concept of the invention is to use an array of transducers (e.g., a linear array) and segment the transducers into three groups: a transmitting aperture and two receiving apertures.

The group of transmitting transducers transmits ultrasound energy into the body of the subject, steering the beam in a conventional manner. This can be accomplished either by using normal linear array beam forming (stepping across the aperture) or by treating a central section of the array as a small phased array and steering across a sector. As in conventional color flow imaging, several firings would be made in the same direction for the color flow estimates.

Two other groups of transducers would be located on each side of the transmitting elements and would be used as small phased arrays to receive ultrasound echoes from the flow region being imaged. The reception apertures may overlap the transmission aperture, i.e., the same transducer may operate first in a transmission mode as part of the transmission aperture and later in a reception mode as part of a reception aperture. Also the transducers used in the reception apertures may change dynamically as a function of the transmit vector position and possibly range depth along a received vector. Both groups of receiving transducers would simultaneously be dynamically steered to the same location to track the ultrasound signal along the transmitted line of sight.

The present invention is a triangulation method and apparatus for measuring the velocity along two lines of sight which have different vector components. The outcome of this triangulation process is the calculation of velocity along the x and y directions of an arbitrary cartesian (or any other orthogonal) coordinate system. The relative precision of the orthogonal velocity components is a function of the f-number of the viewing aperture and thus is limited by the size of the transducer array.

The preferred embodiments utilize a system architecture wherein the flow velocity along two different image vectors can be measured simultaneously by separately processing the signals from the left and right reception apertures. Likewise, the transmitters for each element are separately programmable, allowing for the establishment of a unique transmission aperture.

Two different triangulation approaches are being proposed herein. The difference in the two triangulation methods lies in how the transducers in the linear array are used to form the reception apertures. In accordance with the first preferred embodiment of the invention, the positions of the two reception apertures are held constant and the conventional dynamic time delays on receive from Eq. (2) are used to steer the apertures to follow the transmitted energy as a function of range depth. It should be noted that unlike conventional imaging, $\theta$ will now be varying dynamically with range cell depth (time), and this will need to be reflected in the receive time delays of Eq. (2). In accordance with the second preferred embodiment, the transducers included in each reception aperture are dynamically reassigned in order to maintain a fixed triangulation angle. In this case a reception aperture shifts away from the transmission aperture to track the received backscattered ultrasonic energy at a constant triangulation angle.

DETAILED DESCRIPTION OF THE PREFERRED EMBODIMENTS

In accordance with the invention, an array 10 (e.g., a linear array) of transducers is segmented into one group of transmitting transducers 12 (see FIG. 3A) which are fired in timed sequence and two groups of receiving transducers 14 and 16 (see FIG. 3B) which are activated to receive echoes in timed sequence.

Figure 3A:
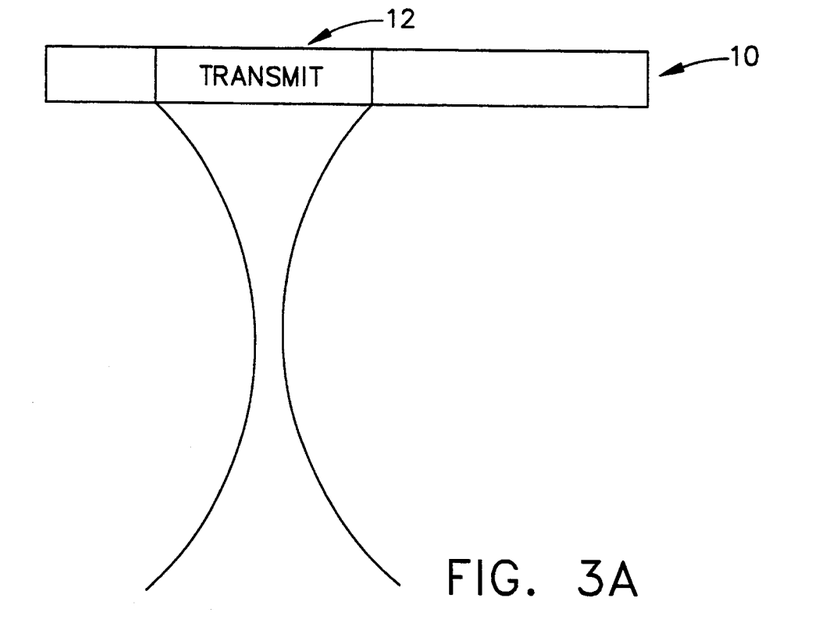
FIG. 3A and 3B are diagrams respectively showing the geometry for a beam transmitted along a vector V from a transmission aperture and for beams reflected from points along vector V to respective reception apertures in accordance with the invention.

The transmitting transducers 10 transmit ultrasound energy into the object, steering the beam in a conventional manner, i.e., by timing the firings so that the ultrasonic waves transmitted by respective transducers will arrive at a preselected point simultaneously. This can be accomplished either by using normal linear array beam forming (stepping across the aperture) or by treating a central section of the array as a small phased array and steering across a sector.

Figure 3B:
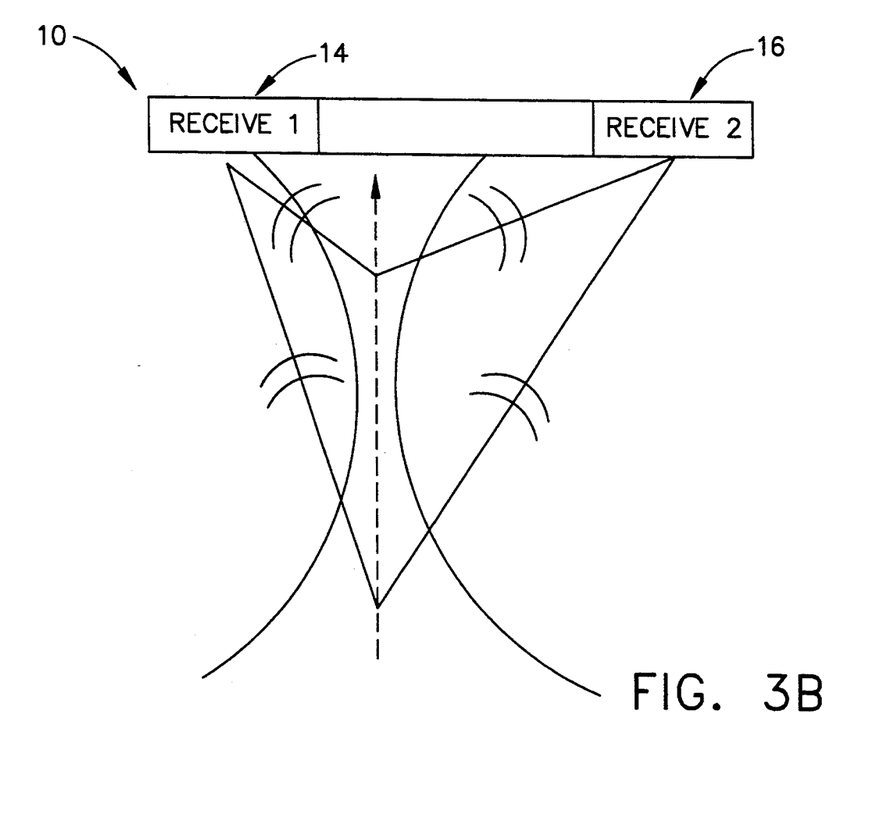

In accordance with the invention, the two groups of receiving transducers are used as small phased arrays to receive ultrasound echoes from the flow region being imaged. Bearing in mind that each transducer is capable of operating in a transmission mode or a reception mode, the reception apertures may overlap the transmission aperture. Also the transducers used in the reception apertures may change dynamically as a function of the transmit vector position and possibly range depth along a received vector. In the first preferred embodiment, both groups of receiving transducers would simultaneously be dynamically steered to the same location to track the ultrasound signal along the transmitted line of sight at a predetermined range.

Figure 4:
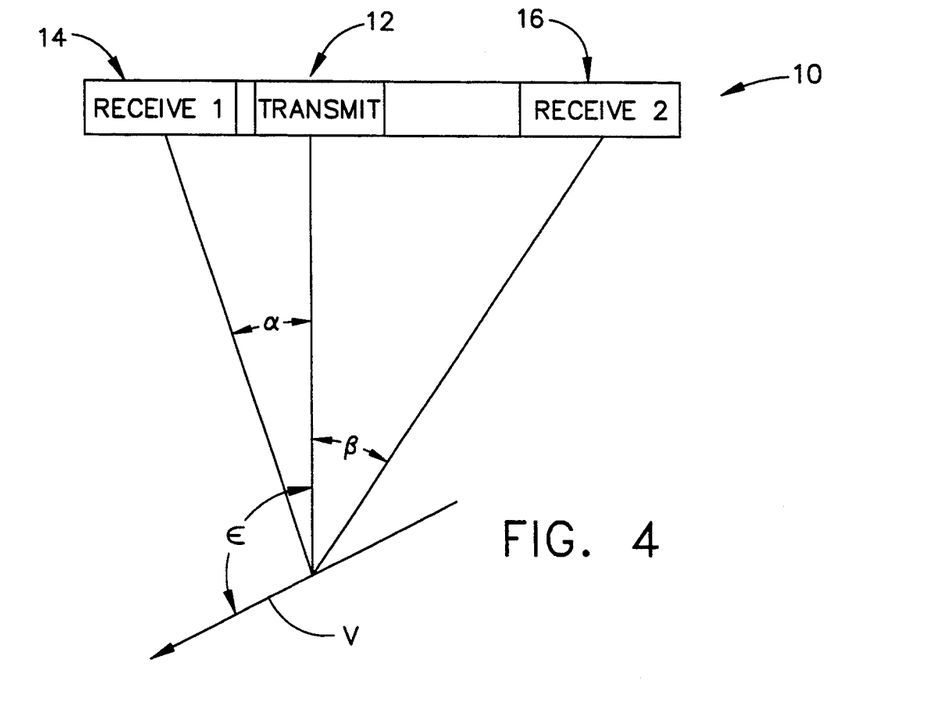
FIGS. 4 through 6 are diagrams showing various dimensions utilized in a mathematical analysis of the principle of the invention.

Using this method, two flow vector components will be obtained simultaneously, one from each reception aperture. These two components can be combined in the geometric fashion to produce the true velocity of the flowing object. Referring to FIG. 4, $\alpha$, $\beta$ and $\epsilon$ represent the angles between the transmission vector (i.e., the line of sight from the center of the transmission aperture to the range cell) and the line of sight from one particular range cell to the centers of the first and second reception apertures and the true flow direction, respectively.

The Doppler shifts measured by the two reception apertures are $$f_1 = \frac{f_0 v}{c} [\cos\epsilon + \cos(\epsilon - \alpha)] \quad (3)$$

$$f_2 = \frac{f_0 v}{c} [\cos\epsilon + \cos(\epsilon + \beta)] \quad (4)$$

where $f_0$ is the transmitted frequency, v is the flow velocity and c is the speed of sound. Using the geometric angle sum and difference identities, Eqs. (3) and (4) can be written as $$f_1 = \frac{f_0 v}{c} [\cos\epsilon + \cos\epsilon\cos\alpha + \sin\epsilon\sin\alpha] \quad (5)$$

$$f_2 = \frac{f_0 v}{c} [\cos\epsilon + \cos\epsilon\cos\beta - \sin\epsilon\sin\beta] \quad (6)$$

Dividing Eq. (5) by Eq. (6) and solving for $\epsilon$ yields $$\epsilon = \tan^{-1}\left[\frac{f_1(1+\cos\beta) - f_2(1+\cos\alpha)}{f_1\sin\beta + f_2\sin\alpha}\right] \quad (7)$$

The true velocity can then be calculated by plugging the calculated value of $\epsilon$ into Eq. (3) or (4) and solving for v.

It should be noted that for the first preferred embodiment $\alpha$ and $\beta$ will be dynamically changing with the range cell position (time) along the transmitted vector. Therefore, to accomplish the correct reception beamforming, the transducer elements in each of the reception apertures must be dynamically steered on receive, and the two summed subaperture waveforms time delayed relative to each other, where the relative time delay also depends on the range of the cell of interest and therefore must vary dynamically.

Figure 5:
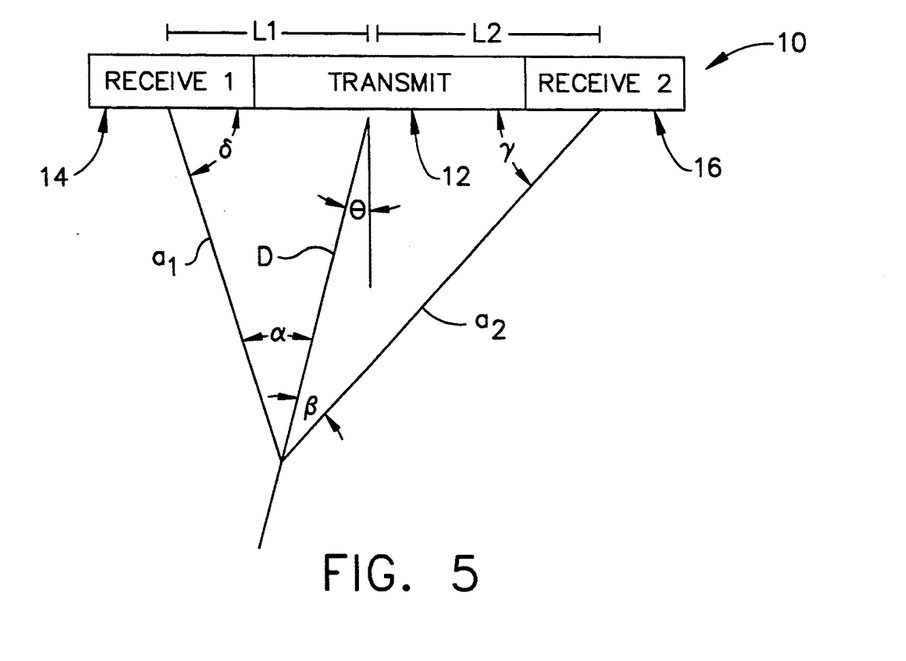

If the transmitted pulse is steered at an angle $\theta$ (see FIG. 5), then the signal from a range cell a distance D from the transducer face will be obtained after a time $$t_1 = \frac{\alpha_2 + D}{c} \quad (8)$$

in the first reception aperture 14, where $\alpha_1$ is calculated by the law of cosines:

$$\alpha_1^2 + D^2 + L_1^2 2DL_1 \sin\theta \quad (9)$$

and equivalently the signal will reach the second reception aperture 16 after a time $$t_2 = \frac{\alpha_2 + D}{c} \quad (10)$$

where $$\alpha_2^2 = D^2 + L_2^2 + 2DL_2 \sin\theta \quad (11)$$

In the above equations, $L_1$ and $L_2$ are the distances from the center of transmission aperture 12 to the centers of first and second reception apertures 14 and 16, respectively. The front-end beam steering must be such that at time $t_1$, the first reception aperture 14 is being steered at an angle $$\delta = \cos^{-1}\frac{\alpha_1^2 + L_1^2 - D^2}{2\alpha_1 L_1} \quad (12)$$

$$\delta = \cos^{-1}\frac{L_1 - 2D\sin\theta}{\sqrt{D^2 + L_1^2 - 2DL_1\sin\theta}} \quad (13)$$

Likewise the front-end beam steering must be such that at time $t_2$, the second reception aperture 16 is being steered at an angle $$\gamma = \cos^{-1}\frac{L_2 + 2D\sin\theta}{\sqrt{D^2 + L_2^2 + 2DL_2\sin\theta}} \quad (14)$$

Thus, the time delays for each reception channel will contain both a relative term to accomplish the dynamic steering to the angles $\delta$ and $\gamma$ and focussing to the distances $\alpha_1$ and $\alpha_2$, and an overall offset $(t_1-t_2)$ to properly align the signals between reception apertures 14 and 16. Both of these terms must dynamically vary as a function of range depth (equivalent to sample time) in a way that satisfies the above equations.

Figure 6:
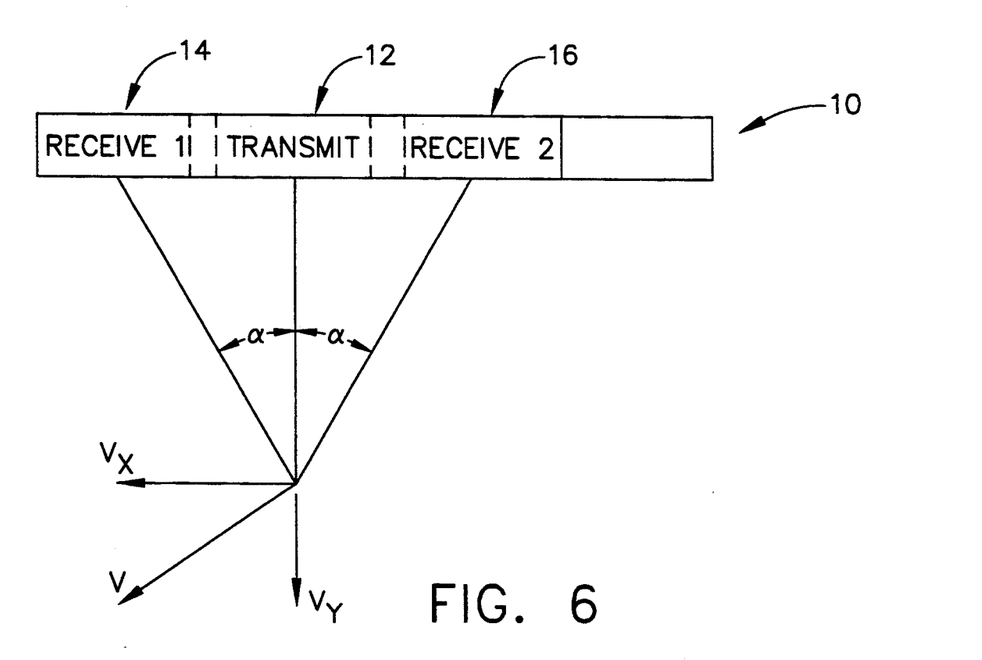

A simpler implementation can be obtained if one varies the location of the transmission and reception apertures from vector to vector such that angles $\alpha$ and $\beta$ are always equal (see FIG. 6). As was shown by Overbeck, the symmetry in the geometry allows one to directly measure the longitudinal ($V_y$) and transverse ($V_x$) components of the velocity vector V by combining the two different Doppler shifts measured by each of the reception apertures:

$$f_L + f_R = (1 + \cos\alpha)\frac{2f_0}{c} V_y \quad (15)$$

$$f_L - f_R = \sin\alpha \frac{2f_0}{c} V_x \quad (16)$$

The subscripts L and R in the above equations refer to the left and right reception apertures, respectively.

Figure 7A:
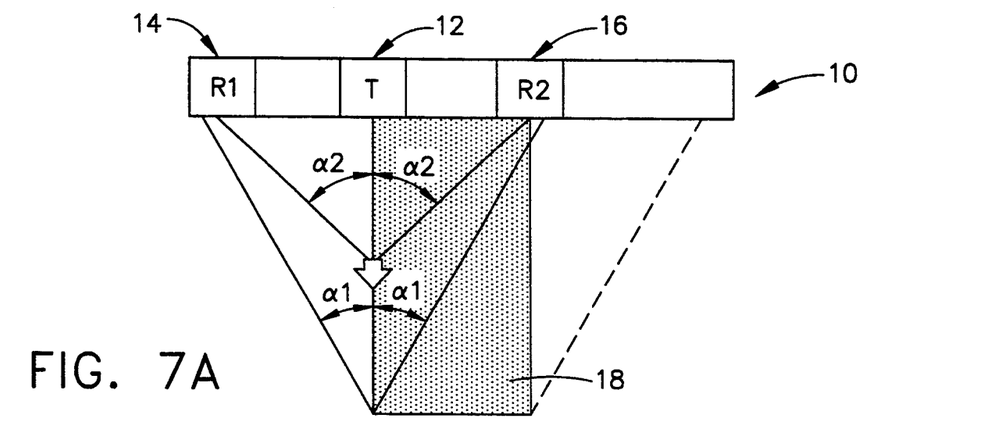
FIGS. 7A, 7B and 7C are diagrams showing the geometry for one symmetric and two asymmetric reception processing variations in accordance with a first preferred embodiment of the invention.
Figure 7B:
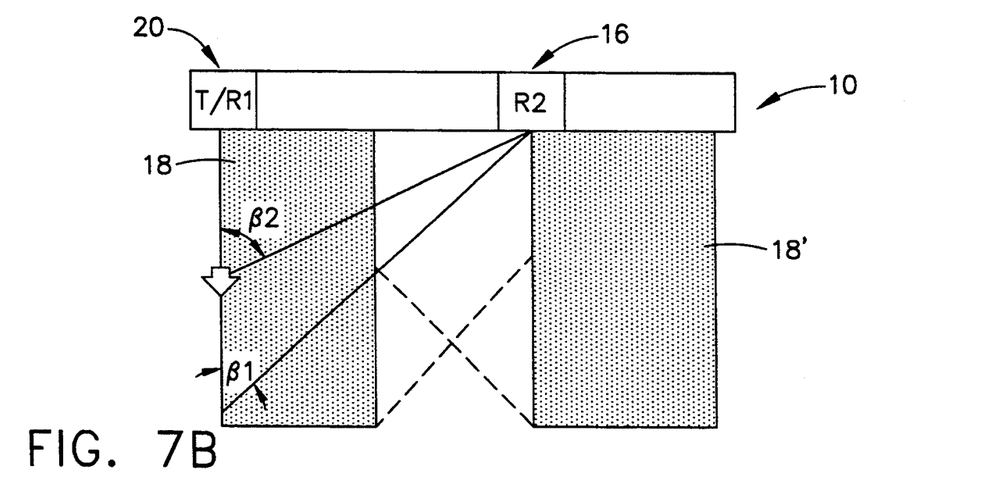
Figure 7C:
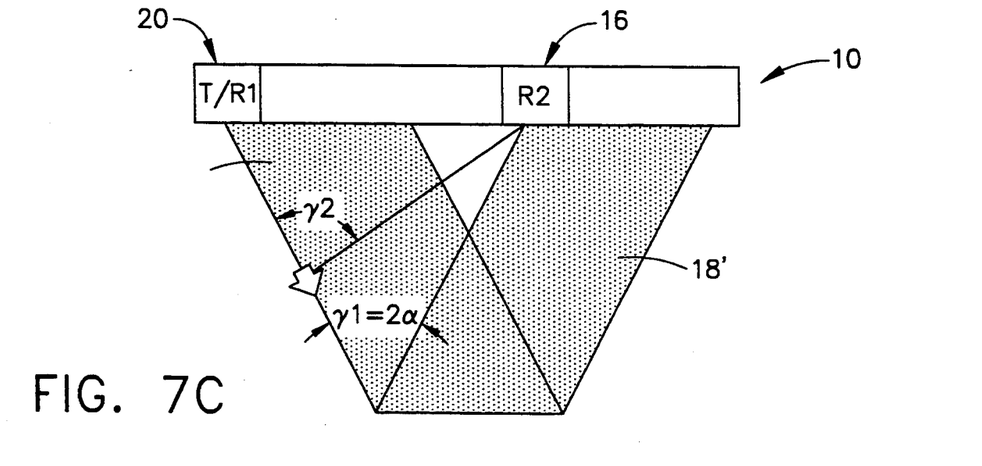

In accordance with one preferred embodiment of the invention, the transducers assigned to each reception aperture are fixed for the entire reception period and dynamically steered to track the received backscattered energy from each sample volume (see FIGS. 7A-7C). This steering has the advantage of looking like dynamic focus on receive over the entire array, but causes the relative precision for velocity components $V_y$ and $V_x$ to vary with range depth, since the triangulation angle will be dynamically changing as a function of range depth.

FIGS. 7A-7C show three beamforming strategies in accordance with a first preferred embodiment of the invention. The shaded areas 18 indicate the field of view that can be covered if all vectors are required to image at the maximum possible depth. This depth is constrained by the maximum allowable triangulation f-number and a total aperture size. For a 40 mm transducer, the maximum depth of field would be about 5 cm if one requires an f/2 or better triangulation aperture. The width of the covered field of view 18 in FIG. 7A is only about 1.3 cm, which can be increased in the asymmetric variations shown in FIGS. 7B and 7C by using both ends of the area for transmission. The width of the field of view can also be widened by imaging at shallower depths, as indicated by the dashed lines in FIG. 7A and 7B. The best scenario is to use the symmetric reception processing of FIG. 7A for the middle ⅓ transmission apertures and the asymmetric reception processing of FIG. 7B for the rest of the imaging field, providing a maximum field of view at the expense of needing two different sets of beamforming equations and slightly different estimation mathematics in the color flow processor for calculating the velocity components using the two different geometries.

The alternative mathematics for deriving the orthogonal velocity estimates using the geometries in FIGS. 7B and 7C can be derived from the general case presented in Eqs. (3) and (4). For the geometry of FIG. 7B, the longitudinal and transverse velocity components are given by:

$$V_y = \frac{c}{2f_0} f_L \qquad (17)$$

$$V_x = \frac{c}{2f_0} \frac{f_L(1 + \cos\beta) - 2f_R}{\sin\beta} \qquad (18)$$

Likewise, for the geometry of FIG. 2C:

$$V_y = \frac{c}{2f_0} \frac{f_R}{\cos(\gamma/2)} \qquad (19)$$

$$V_x = \frac{c}{2f_0} \frac{f_L - f_R}{\sin(\gamma/2)} \qquad (20)$$

In each instance, $\beta$ and $\gamma$ are changing dynamically with the range cell depth.

An alternative proposal would be to dynamically reassign the elements corresponding to each receive aperture, in an effort to maintain a fixed triangulation angle that would be large enough that the relative precision between the orthogonal velocity components is acceptable. In this case, one or both of the reception apertures would slide away from the transmission aperture to track the received backscattered energy at a constant triangulation angle (see FIGS. 8A, 8B and 8C).

Figure 8A:
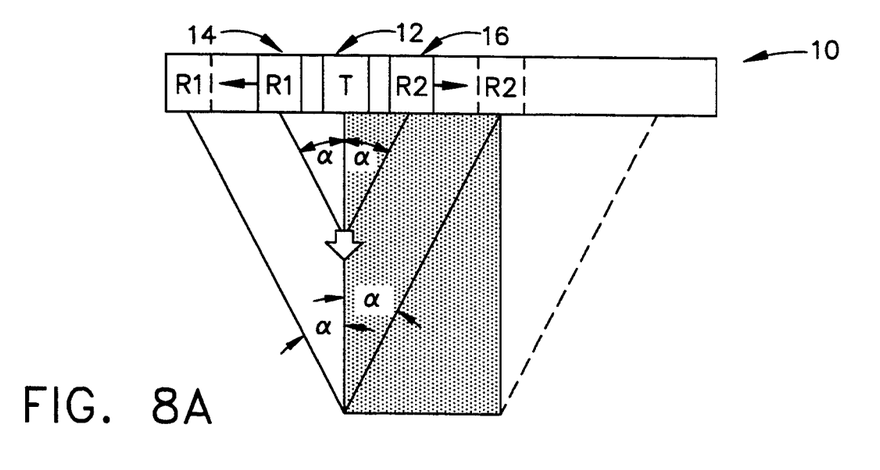
FIGS. 8A, 8B and 8C are diagrams showing the geometry for one symmetric and two asymmetric reception processing variations in accordance with a second preferred embodiment of the invention.
Figure 8B:
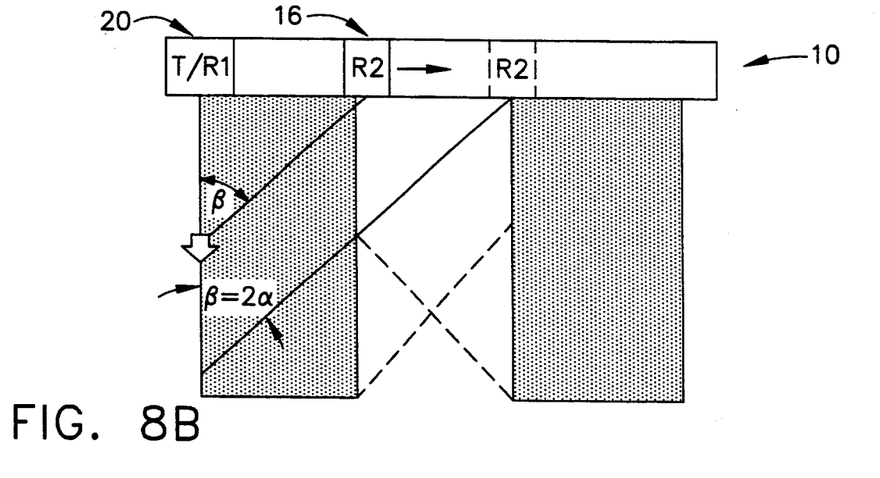
Figure 8C:
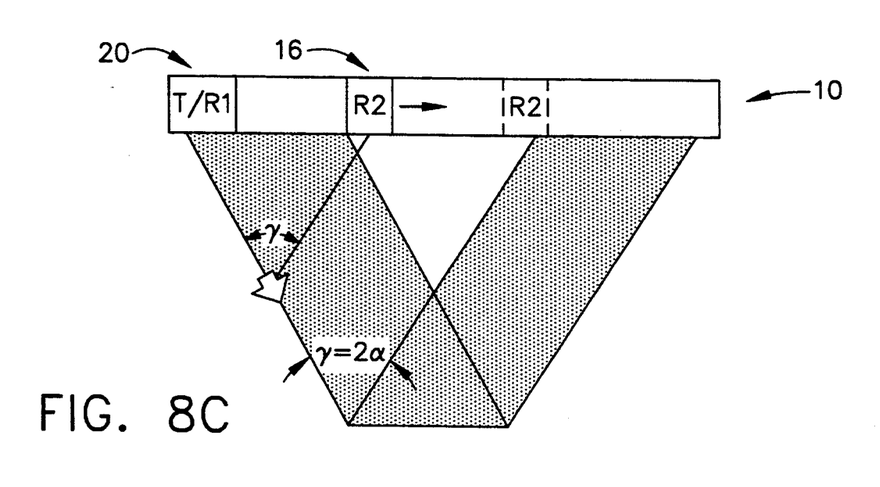

This has the advantage that the receive apertures do not have to be dynamically steered. This simplifies the receive time delay beamforming equations (see Eq. (2)) and the mathematics associated with calculating the orthogonal velocity components, because the angular dependence is not changing dynamically with range cell depth. With this exception, the mathematics of calculating the orthogonal color flow estimates for geometries shown in FIGS. 8A–8C is identical to the corresponding cases in the first preferred embodiment of FIG. 7.

The shifting reception apertures can be realized by sequentially turning on elements at increasing distances from the transmit aperture and turning each element off at a time dt later. This would produce an aperture that slides outward from what is still considered the phase center of the array.

The foregoing preferred embodiments have been disclosed for the purpose of illustration. Variations and modifications will be readily apparent to those skilled in the art of ultrasonic imaging systems. All such variations and modifications are intended to be encompassed by the claims set forth hereinafter.

We claim:

1. A method for determining the velocity of a flowing material using an array of ultrasonic transducers, comprising the steps of:
    (a) activating each of a first plurality of ultrasonic transducers of said array to transmit an ultrasonic beam of a predetermined frequency, said first plurality of ultrasonic transducers forming a transmission aperture, each transducer of said transmission aperture being activated at times such that said transmitted ultrasonic beam is directed along a first vector from a center of said transmission aperture through a first point of interest located at a first range and a second point of interest located at a second range;
    (b) steering and focussing a second plurality of ultrasonic transducers of said array forming a first reception aperture to detect a first backscattered ultrasonic beam directed along a first line of sight from said first point of interest to a center of said first reception aperture, said first backscattered ultrasonic beam being formed when said transmitted ultrasonic beam arrives at said first point of interest;
    (c) steering and focussing a third plurality of ultrasonic transducers of said array forming a second reception aperture to detect a second backscattered ultrasonic beam directed along a second line of sight from said first point of interest to a center of said second reception aperture, said second backscattered ultrasonic beam being formed when said transmitted ultrasonic beam arrives at said first point of interest;
    (d) steering and focussing said second plurality of ultrasonic transducers of said first reception aperture to detect a third backscattered ultrasonic beam directed along a third line of sight from said second point of interest to said center of said first reception aperture, said third backscattered ultrasonic beam being formed when said transmitted ultrasonic beam arrives at said second point of interest;
    (e) steering and focussing said third plurality of ultrasonic transducers of said second reception aperture to detect a fourth backscattered ultrasonic beam directed along a fourth line of sight from said second point of interest to said center of said second reception aperture, said fourth backscattered ultrasonic beam being formed when said transmitted ultrasonic beam arrives at said second point of interest; and
    (f) determining first through fourth Doppler shifts in the frequencies of said first through fourth backscattered ultrasonic beams, respectively.

2. The method as defined in claim 1, further comprising the steps of:
    determining the true velocity of said flowing material at said first point of interest as a function of said first and second Doppler shifts; and
    determining the true velocity of said flowing material at said second point of interest as a function of said third and fourth Doppler shifts.

3. The method as defined in claim 1, wherein said array of ultrasonic transducers is linear.

4. The method as defined in claim 1, wherein at least one of said ultrasonic transducers is common to said transmission aperture and said first reception aperture for scanning along said first vector.

5. The method as defined in claim 1, wherein said transmission aperture and said first and second reception apertures are shifted in unison relative to said array for each vector extending from said center of said shifted transmission aperture in parallel with said first vector, said apertures being maintained in a predetermined geometric relationship during said shifting, said sequence of steps (a) through (f) being performed successively for each vector.

6. The method as defined in claim 1, wherein said transmission aperture and said first and second reception apertures are held fixed relative to said linear array during scanning along said first vector, the ultrasonic transducers of said first and second reception apertures being dynamically steered for each change in the range of the point of interest along said first vector.

7. The method as defined in claim 1, wherein said transmission aperture is held fixed and said first reception aperture is shifted relative to said transmission aperture such that said first line of sight is parallel to said third line of sight.

8. The method as defined in claim 7, wherein said second reception aperture is shifted relative to said transmission aperture such that said second line of sight is parallel to said fourth line of sight, said first and second reception apertures being shifted in opposite directions.

9. A method for determining the velocity of a flowing material at a plurality of points located at different ranges along a first vector using a linear array of ultrasonic transducers, comprising the steps of:
 (a) activating each of a first plurality of ultrasonic transducers of said array to transmit an ultrasonic beam of a predetermined frequency, said first plurality of ultrasonic transducers forming a transmission aperture, each transducer of said transmission aperture being activated at times such that said transmitted ultrasonic beam is directed along said first vector from a center of said transmission aperture through each of said plurality of points;
 (b) steering and focussing a second plurality of ultrasonic transducers of said array forming a first reception aperture to detect respective backscattered ultrasonic beams directed along respective lines of sight from respective ones of said plurality of points to a center of said first reception aperture, said backscattered ultrasonic beams being respectively formed when said transmitted ultrasonic beam arrives at said respective points along said first vector;
 (c) steering and focussing a third plurality of ultrasonic transducers of said array forming a second reception aperture to detect respective backscattered ultrasonic beams directed along respective lines of sight from respective ones of said plurality of points to a center of said second reception aperture, said backscattered ultrasonic beams being respectively formed when said transmitted ultrasonic beam arrives at said respective points along said first vector;
 (d) for each of said points, determining a first Doppler shift in the frequency of the backscattered ultrasonic beam backscattered from each respective point to said first reception aperture; and
 (e) for each of said points, determining a second Doppler shift in the frequency of the backscattered ultrasonic beam backscattered from each respective point to said second reception aperture.

10. The method as defined in claim 9, further comprising the step of determining the true velocity of said flowing material at each of said plurality of points as a function of said respective first and second Doppler shifts.

11. The method as defined in claim 9, wherein at least one of said ultrasonic transducers is common to said transmission aperture and said first reception aperture for scanning along said first vector.

12. The method as defined in claim 9, wherein said transmission aperture and said first and second reception apertures are shifted in unison relative to said array for each vector extending from said center of said shifted transmission aperture in parallel with said first vector, said apertures being maintained in a predetermined geometric relationship during said shifting, said sequence of steps (a) through (e) being performed successively for each vector.

13. The method as defined in claim 9, wherein said transmission aperture and said first and second reception apertures are held fixed relative to said linear array during scanning along said first vector, the ultrasonic transducers of said first and second reception apertures being dynamically steered for each change in the range of the point of interest along said first vector.

14. The method as defined in claim 9, wherein said transmission aperture is held fixed and said first reception aperture is shifted relative to said transmission aperture such that all lines of sight from points along a vector to said center of said first reception aperture are mutually parallel.

15. The method as defined in claim 14, wherein said second reception aperture is shifted relative to said transmission aperture such that all lines of sight from points along said vector to said center of said second reception aperture are mutually parallel, said first and second reception apertures being shifted in opposite directions.

16. An ultrasound color flow imaging system for determining the velocity of a flowing material at a plurality of points of interest along a vector, comprising:
 (a) an array of ultrasonic transducers;
 (b) means for activating each of a first plurality of ultrasonic transducers of said array to transmit an ultrasonic beam of a predetermined frequency, said first plurality of ultrasonic transducers forming a transmission aperture, each transducer of said transmission aperture being activated at times such that said transmitted ultrasonic beam is directed along said first vector from a center of said transmission aperture through each of said plurality of points;
 (c) means for steering and focussing a second plurality of ultrasonic transducers of said array forming a first reception aperture to detect respective backscattered ultrasonic beams directed along respective lines of sight from respective ones of said plurality of points to a center of said first reception aperture, said backscattered ultrasonic beams being respectively formed when said transmitted ultrasonic beam arrives at said respective points along said first vector;
 (d) means for steering and focussing a third plurality of ultrasonic transducers of said array forming a second reception aperture to detect respective backscattered ultrasonic beams directed along respective lines of sight from respective ones of said plurality of points to a center of said second reception aperture, said backscattered ultrasonic beams being respectively formed when said transmitted ultrasonic beam arrives at said respective points along said first vector;

(e) means for determining a first Doppler shift in the frequency of the backscattered ultrasonic beam backscattered from each respective point to said first reception aperture and a second Doppler shift in the frequency of the backscattered ultrasonic beam backscattered from each respective point to said second reception aperture.

17. The system as defined in claim 16, further comprising means for determining the true velocity of said flowing material at each of said points of interest as a function of a respective set of said first and second Doppler shifts.

18. The system as defined in claim 16, wherein said array of ultrasonic transducers is linear.

19. The system as defined in claim 16, wherein at least one of said ultrasonic transducers is common to said transmission aperture and said first reception aperture for scanning along said vector.

20. The system as defined in claim 16, wherein said transmission aperture and said first and second reception apertures are shifted in unison relative to said array for each vector extending from said center of said shifted transmission aperture in parallel with said vector, said apertures being maintained in a predetermined geometric relationship during said shifting.

21. The system as defined in claim 16, wherein said transmission aperture and said first and second reception apertures are held fixed relative to said array during scanning along said vector, the ultrasonic transducers of said first and second reception apertures being dynamically steered for each change in the range of the point of interest.

22. The system as defined in claim 16, wherein said transmission aperture is held fixed and said first reception aperture is shifted relative to said transmission aperture such that all lines of sight from points along said vector to said center of said first reception aperture are mutually parallel.

23. The system as defined in claim 16, wherein said second reception aperture is shifted relative to said transmission aperture such that all lines of sight from points along said vector to said center of said second reception aperture are mutually parallel, said first and second reception apertures being shifted in opposite directions.

* * * * *